Oct. 24, 1950     R. B. POGUE     2,527,072
RIM GRIP BRAKE
Filed June 3, 1946     3 Sheets-Sheet 1
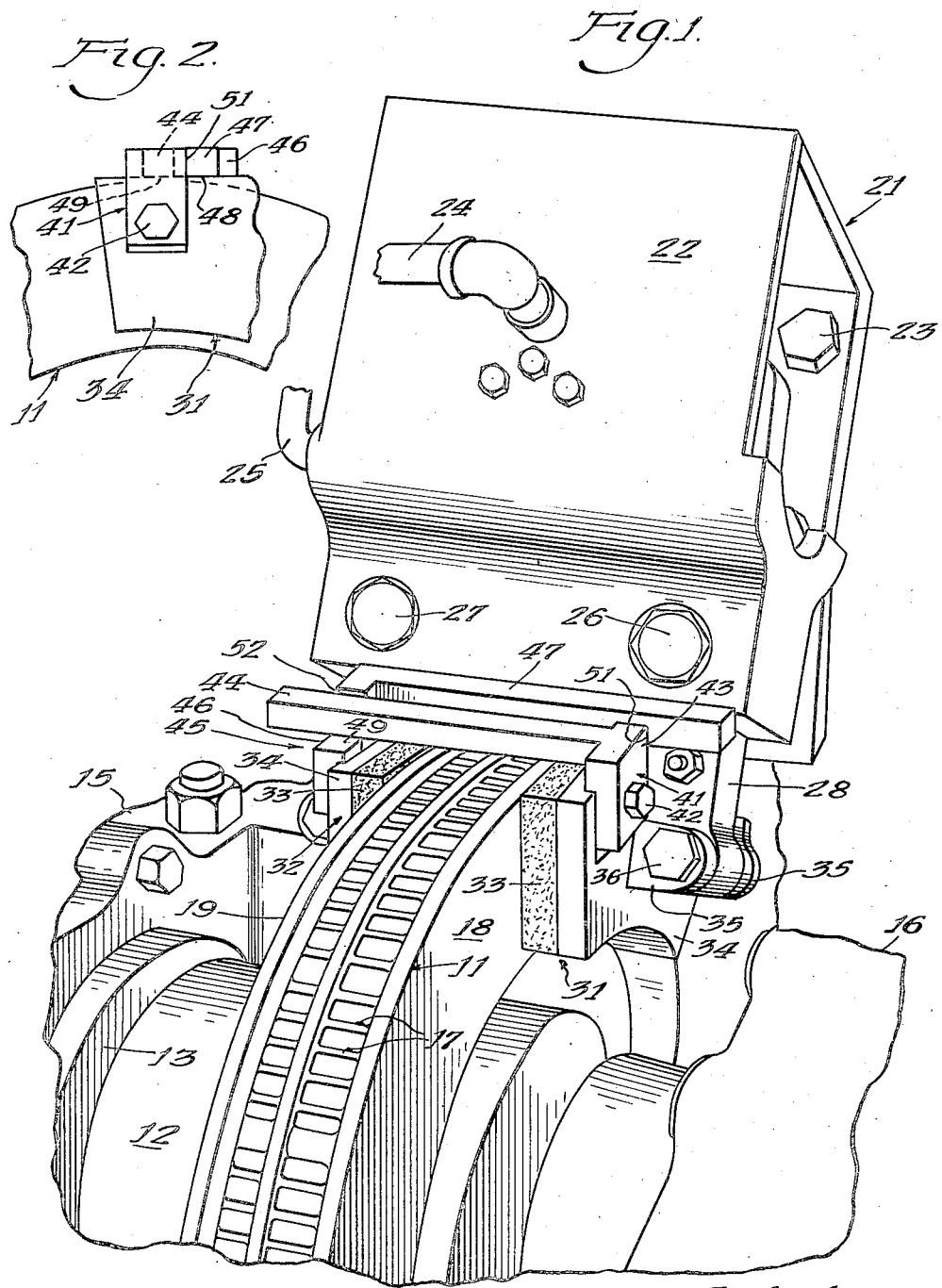
Inventor:
Robert B. Pogue
By: Wallace and Cannon
Attorneys

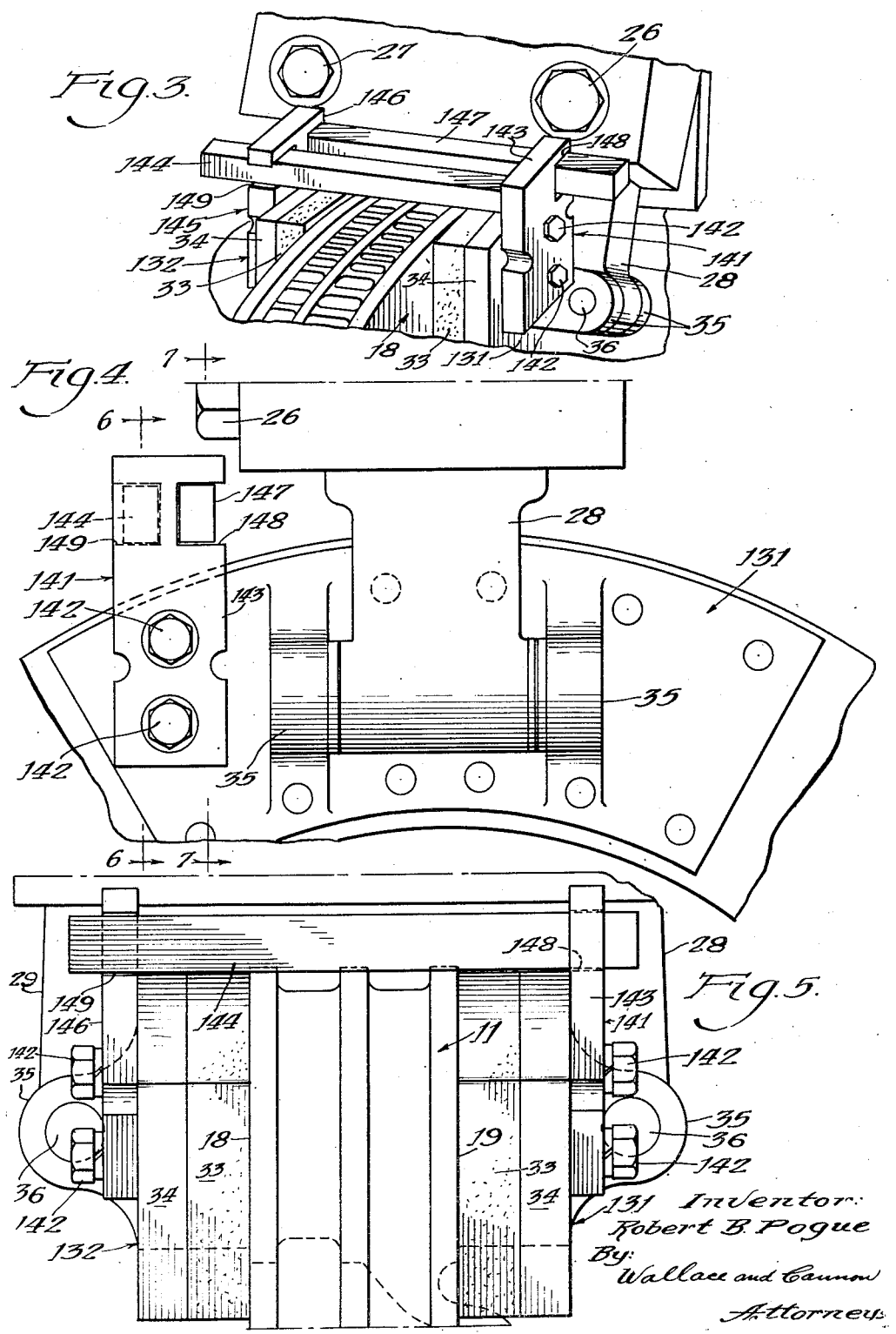

Oct. 24, 1950   R. B. POGUE   2,527,072
RIM GRIP BRAKE
Filed June 3, 1946   3 Sheets-Sheet 3
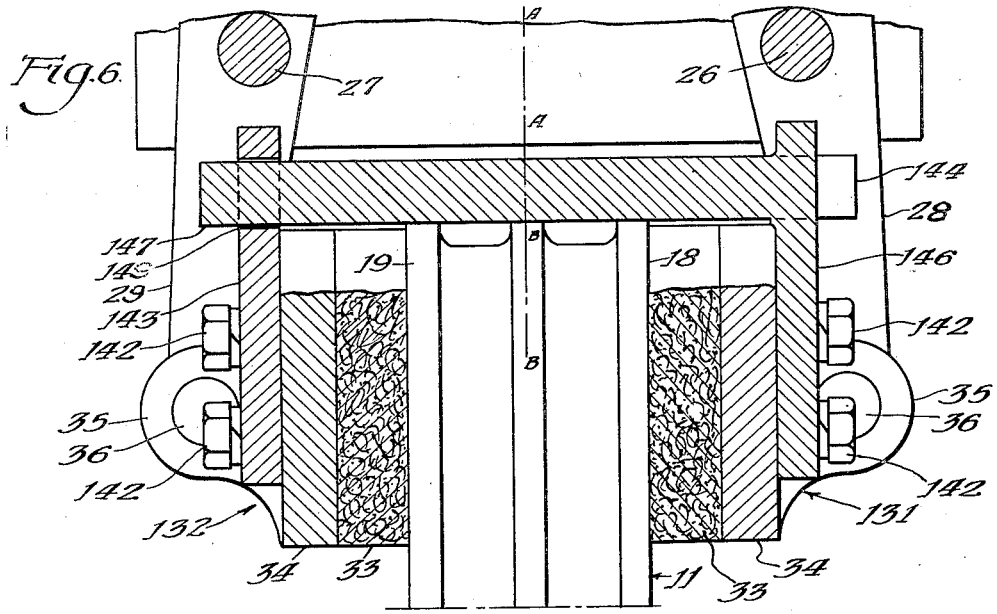
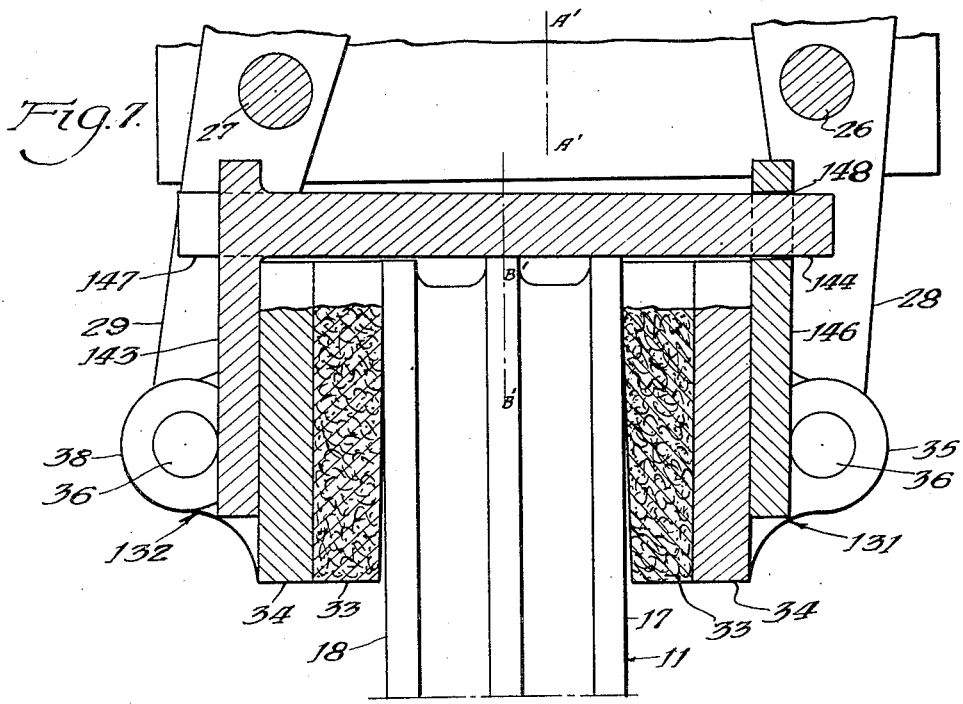
Inventor:
Robert B. Pogue
By:
Wallace and Cannon
Attorneys

UNITED STATES PATENT OFFICE 2,527,072

RIM GRIP BRAKE

Robert B. Pogue, West Orange, N. J., assignor to American Brake Shoe Company, New York, N. Y., a corporation of Delaware Application June 3, 1946, Serial No. 673,923

9 Claims. (Cl. 188—73)

This invention relates to braking apparatus and more particularly to apparatus of this character embodying a disc to at least one face of which one or more braking elements are applied to effect deceleration of the disc and apparatus with which it is connected.

In those instances heretofore where at least one braking element has been applied to at least one face of a disc to effect deceleration thereof and apparatus with which the disc is connected, it has been necessary to accurately apply force to such a braking element so as to insure flat and even seating of the operative face thereof against the face of the disc with which it is to be used. Otherwise experience has shown that the operative face of the braking elements will wear unevenly. This, of course, is highly objectionable since uneven wear of the operative face of braking elements of this character makes it necessary to discard the braking element prior to the time the anticipated life thereof had been realized. The foregoing has been particularly true in those instances where composition friction material has been provided on the operative face of a braking element of the aforesaid character, for in such instances it has been customary to back up such friction material with a metallic reinforcing element. In those instances where the composition friction material wears unevenly the adjacent face of the metallic backing element is approached much more rapidly than this would occur if the friction material should wear away evenly. In this respect, in those instances where composition friction material is employed in the aforesaid manner, it is desirable to avoid wearing away the composition friction material completely at any point so as to expose the metallic reinforcing backing inasmuch as contact of the metallic reinforcing backing with the face of the disc might ofttimes result in scoring or other damaging of the disc.

It is therefore the primary object of my invention to insure that the operative face of a braking element will be applied to the face of a disc to effect deceleration of the disc and apparatus connected thereto in such a way as to promote uniform wearing away of the operative face of the braking element.

In those instances heretofore where a disc has been employed in a braking couple it has been found to be advantageous to arrange opposite faces of the disc in such a way that braking elements could be applied substantially simultaneously to such opposite faces of the disc to effect deceleration of the disc and apparatus connected thereto. In such instances the braking elements have been of arcuate configuration so as to be complementary to braking surfaces afforded on opposite faces of the disc, and usually such braking elements have been applied to but a portion of such braking surfaces. In arrangements of this character it has been customary to support the braking elements at corresponding ends of lever arms that have been fulcrumed in such a way that when pressure is applied to ends of the lever arms opposite those whereat the braking elements are supported such elements are forced into engagement with braking surfaces on opposite sides of a disc. In many such instances in the past the braking elements have been pivotally connected to the lever arms and in such circumstances it has been necessary to accurately relate the pivotal mounting of the braking element to the operative face of the element so as to thereby insure flat and even application of such operative face of the element to the braking surface with which it is adapted to cooperate to effect deceleration of the disc and apparatus connected thereto. Since it is customary in such circumstances to arrange for the removal of one such braking element and the replacement thereof by another such element, it has been necessary heretofore to accurately manufacture the various elements so as to insure the desired relation between the pivotal mounting and the operative face of such an element. This has usually contributed to a substantial increase in manufacturing costs of such elements and in practice has not been fully satisfactory, even at increased cost. It is, therefore, yet another object of this invention to so arrange a braking element of the aforesaid character and the pivotal mounting thereof in such a manner that a highly accurate relationship need not be established between the pivotal mounting of such an element and the operative face thereof. Objects related to the foregoing are to insure that the operative face of a braking element of the aforesaid character will be properly engaged with the braking surface on a disc with which it is adapted to cooperate, and to insure that the operative face of a braking element of the aforesaid character will cooperate with a braking surface on the side of a disc in such a way as not to promote uneven wear of the operative face of such element.

Further objects of this invention are to utilize means in association with a braking element of the aforesaid character that will be effective to guide the operative face of such a braking element into proper relation with a braking surface on the side of a disc and to insure against binding of such guide means so as to thereby insure that such guide means will not prevent proper cooperation between the operative face of a braking element and the braking surface with which it is to be engaged.

In those instances where braking elements are pivotally connected to lever arms in the above described manner so as to be arranged in at least substantially opposed relation to thereby cooperate with braking surfaces on opposite faces of a disc, it is a yet further object of this invention to so interrelate the braking elements that the operative faces thereof will be mutually guided into proper cooperation with the braking surfaces with which they are respectively adapted to cooperate. Objects ancillary to the foregoing are to afford a guiding device on each of such elements and to extend the guiding device on one such element into operative relation with the other element to thereby interrelate the elements and insure proper positioning thereof with the braking surfaces with which such elements are respectively adapted to cooperate and to so arrange such guiding devices as to prevent such binding thereof as might be effective to prevent proper functioning of the braking elements.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a perspective view of a disc brake arrangement embodying one form of my invention;

Fig. 2 is an end elevational view of one of the braking elements shown in Fig. 1 and also showing the interrelation between such element and the guiding device on the other element of a disc brake arrangement;

Fig. 3 is a fragmentary perspective view of a disc brake arrangement embodying another form of my invention;

Fig. 4 is a fragmentary elevational view looking at the right-hand side of the braking arrangement as shown in Fig. 3;

Fig. 5 is an elevational view of the braking arrangement shown in Fig. 3 looking in a direction perpendicular to that of Fig. 4;

Fig. 6 is a vertical sectional view taken substantially on the line 6—6 on Fig. 4; and Fig. 7 is a view somewhat similar to Fig. 6 but taken on the line 7—7, Fig. 4, and showing certain parts in a different operative position thereof from the position shown in Fig. 6.

One embodiment of my invention is shown in Figs. 1 and 2 of the drawings. Fig. 1 shows a brake disc element 11, mounted for rotation on a supporting shaft to which it is non-rotatably secured in any desired manner. The shaft 12 may be mounted in supporting frame elements 15 and 16 which, if desired, may be merely mountings for the bearings or they may comprise housing elements for parts, not shown, associated with the shaft 12.

This invention is particularly adapted to heavy duty service and the shaft 12 may be, for example, an axle of a railroad car, tender or locomotive, or it may be the axle, or a hub member, of an automotive truck, or a shaft in a machine which requires periodic and effective braking. In railway applications, the braking apparatus to be described hereinbelow may be applied, if desired, directly to the face or faces of a car or locomotive wheel which wheel would then constitute the braking disc 11. Such an arrangement is shown broadly in the patent to Trainer No. 2,352,223, patented June 27, 1944. As shown herein, however, the disc is specially designed for braking, being provided with cooling fins 17 for dissipating heat generated by braking friction to the atmosphere. If desired, the disc might be provided with other types of cooling elements, such as means for circulating a fluid therethrough or external means for applying a coolant thereto may be provided as disclosed in my Patent No. 2,378,100 patented June 10, 1945.

The brake disc 11, as shown herein and preferably as used in connection with the braking elements to be described hereinbelow, is provided with opposed braking faces 18 and 19 which are substantially parallel to each other and each of which is of a character and material adapted to cooperate effectively with a friction brake shoe.

A brake operating mechanism, indicated generally at 21, is shown above the disc 11 in Fig. 1. This mechanism comprises a housing 22 for a set of brake operating elements which may be of any suitable character but are preferably of the hydraulic type. The housing 22 is secured to a suitable rigid support or frame member, not shown, by means such as studs or bolts 23. Hydraulic connections are indicated at 24 and 25. These connections lead to a suitable source of hydraulic pressure, such as a pump or a piston, not shown.

A pair of pivot pins or bolts 26 and 27 are mounted in the lower part of the housing 21 to support a pair of hangers 28 and 29, respectively. These hangers are each adapted to carry a brake shoe, that carried by hanger 28 being shown at 31 and that carried by hanger 29 being shown at 32. These hangers are so pivoted and the shoes are so mounted thereon as to permit movement of the shoes toward and away from braking engagement with a face 18 or 19 of the brake disc. Each of the brake shoes 31 or 32 comprises a friction element 33 in the form of a block of suitable friction material, carried by a backing or body member 34. Each backing member is provided with ears 35 adapted to be pivotally connected to the lower end of an aforesaid hanger or arm 28 or 29 by means such as a pin or bolt 36. It will be understood that the upper ends of arms or hangers 28 and 29 extend beyond the pivot pins 26 and 27 and are connected to operating means such as hydraulic plungers or the like adapted to move the arms simultaneously about the pivot pins 26, 27 so as to move both shoes into or out of braking engagement with the disc or wheel 11.

It has been found in practice that although the supporting lugs 35 for each of the brake shoes are located centrally of the shoe so as to apply the friction elements 33 with substantially uniform pressure over their faces during braking, nevertheless the friction elements tend to wear unequally unless some means are provided to prevent such wear. This is due in part to the tangential forces applied by the rotating disc to the friction element and is due in part to other causes such as variations in resistance to wear of the friction block, vibration, misalignment, etc. The uneven wear which results makes it necessary to replace brake blocks, or at least the friction elements thereof much more frequently than would be necessary if the wear were even. Accordingly, this invention contemplates the provision of guide means for each of the brake shoes which guide means are effective to maintain proper alignment and to cause the friction elements to engage the disc faces squarely so as to wear evenly. These means will next be described.

The brake shoe 31, as previously noted, comprises a backing plate or body member 34 which supports the friction element and also bears the shoe supporting ears 35. As shown in Figs. 1 and 2, a guide member 41 is attached to the body member 34 by means such as a stud 42. This guide member comprises a rigid vertical block or plate 43 which is firmly attached to the member 34 and a horizontal arm 44 extending from the block or plate 43 across the periphery of the disc to and across the top of the opposing brake shoe 32. The arm 44 is preferably integral with the block or plate 43.

On the opposing shoe 32 a generally similar guide member 45 is mounted in similar fashion to the body member 34. The guide member consists of a vertical block or rigid plate 46, secured to the outer vertical face of the body member 34 as by a stud identical with stud 42, and a horizontal arm 47 extending across the periphery of the disc and to and across the brake shoe 31.

Each of the horizontal arms extends as a cantilever across the block or plate which is integral with the other arm. Each of these block or plate members 43 and 46 has a substantially horizontal guide surface rigidly related thereto, and on which the arm from the opposing shoe may rest for sliding movement thereover as the brake shoes are applied to or released from the disc faces. Thus the block 46 has a surface 49 formed thereon for cooperation with the arm 44, while a similar surface 48 is formed adjacent to the block 43 on the edge of the plate 34. In addition, each block or plate 43 and 46 has a substantially vertical shoulder 51 and 52, respectively, against which the side of the arm 47 or 44, respectively, may abut to prevent tilting or twisting of the brake shoe out of parallelism with the faces of the disc. These shoulders permit the bars 44 and 47 to slide in the direction of their length, and to rise vertically with respect to said shoulders. With this construction, when the brakes are applied, tangential motion of the disc does not wear the heel or rear part of the brake shoe friction block more rapidly than the toe or forward part, nor can the upper part of the friction block wear more rapidly than the lower part, because the lever arms 44 and 47 keep the shoes in general alignment. The shoes are permitted, however, to make minor self-adjustments, and the guide bars may slide freely over opposing guide surfaces without any binding action since they are free to rise against the vertical shoulder, or to swing away from it somewhat, if the direction of brake application happens not to be strictly parallel to the axis of the disc. Since there is some vibration in the shoes as the brakes are applied, this freedom of movement is desirable in certain constructions to prevent binding of the sliding parts which might interfere with the application of the brakes and more particularly with their release.

Figs. 3 to 7 show another form of my invention where the guide means are restricted against vertical movement, certain freedom of movement being allowed in a horizontal plane only. As shown in Fig. 3, the right brake shoe 131 bears a guide member 141 comprising a block 143 rigidly secured to the backing member 134 by studs or bolts 142. The block 143 has an integral lever 144 extending as a cantilever across the periphery of the disc 11 and engaging a guide notch in the opposing block 146 which comprises part of the opposite guide member 145. The block 146 carries an integral lever 147 which extends across the disc periphery to a guide notch in the first block 143. The guiding notch or slot in block 143 is shown at 148 and that in the other block 146 is indicated at 149, Figs. 3, 4.

It should be particularly noted that the guide notches 148 and 149 are slightly larger in a vertical direction than the corresponding dimension of the guide lever or bar 144 or 147 which they receive. This construction is necessary to prevent binding as brakes are applied and released. Necessary manufacturing tolerances and wear in other parts such as the ears 35, the links 28, pivot pins 26 and 27, and the brake disc and brake shoes themselves require that a certain freedom of movement be permitted in the guide elements to avoid binding. Such binding would interfere particularly with release of the brakes after their application. Experiments have shown that sufficient freedom of movement may be permitted in the guide elements 144 and 149, and 147 and 148, respectively, that binding is avoided without permitting material misalignment or uneven application of the brake shoes.

An extreme condition of misalignment is represented in the contrast between Figs. 6 and 7. In Fig. 6, the center line of the pivots 26 and 27, on which hangers 28 and 29 are mounted, is indicated by the line A—A. The center line of the disc, which is the center line between the brake shoes 31 and 32, is indicated at B—B. As shown in Fig. 6, these center lines are in alignment which is a desirable normal operating condition. However, in Fig. 7, corresponding lines A'—A' and B'—B', are shown considerably out of alignment, to an exaggerated degree, but representative of conditions which may possibly be realized in practice. Uneven wear of the disc or the bearings which support the shaft which mounts it, wearing of one of the brake shoes to a much greater degree than the other, and misalignment of the brake operating mechanism with respect to the disc and shoes, all might contribute to produce the condition indicated in Fig. 7. In this case the shoes will be applied with a slight degree of inequality, but with the guiding means 144 and 149 (Fig. 6), and guiding means 147 and 148 (Fig. 7), serious misalignment of the brake shoes to the faces of the disc is prevented, even with the extreme conditions of misalignment between the disc and the brake operating means indicated in Fig. 7.

It will of course be understood that the heights of guide slots 148 and 149, although somewhat greater than the heights of the guide bars 147 and 144 which they respectively receive, are not so great as to provide undue play so as to permit material misalignment of the brake shoes. The guide bars or levers 144 and 147 are relatively long so that considerable freedom of movement may be permitted in the guide slots with only very minor variation in the brake blocks from a condition of true parallelism with the braking surfaces of the disc 11.

It will be understood that the modification of my invention described in connection with Figs. 1 and 2 of the drawings differs from that described in connection with Figs. 3 to 7 only in that the first modification leaves the guide bars or levers free to swing upwardly whereas in the second modification the bars are limited in such upward movement. For many uses the former will be found satisfactory since the normal tendency is for the brake shoes to wear more rapidly at the outer periphery of the disc where velocity is greatest and this tends to tilt the shoes inwardly at the top portions thereof. Such tilting is prevented just as effectively by the first modification, as shown in Figs. 1 and 2, as in the second modification, and freedom from binding is obviously superior. However, in other applications, it will be found desirable or necessary to prevent the shoes from wearing unevenly at their lower or inner portions in which case the notched guides 148 and 149, Figs. 3 to 7, will be found to be superior.

In both forms of my invention, the brake shoes are applied evenly and smoothly, and the friction blocks 33 thereof may be almost entirely consumed before the backing or body members 34 begin to be exposed and replacement becomes necessary. By thus insuring even and uniform wear replacement of brake shoes (or of friction elements thereon) is not required as often as would otherwise be required and this results in considerable economy. In addition, braking is more efficient and effective and scoring of the disc itself is avoided.

While I have disclosed the application of a pair of opposed brake shoes to a single disc, it will be understood that a single shoe or multiple shoes could be applied to only one face of a disc, or that various combinations of brake shoes might be used with various arrangements of discs. Further, it will be understood that the particular forms of guiding elements may be varied to meet requirements and that clearances and tolerances to avoid binding will be adjusted according to the particular needs of the installation. The guide elements should be as free as may be permitted without allowing objectionable misalignment or uneven application between the brake shoes and the braking surfaces of the disc. On the other hand, requirements for true alignment of the brake elements may be met as closely as operating clearances to avoid binding between the guide elements will permit. The use of relatively long guide levers as compared with dimensions of other parts of the brake shoes tends to minimize inequalities or misalignments in braking.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. A brake mechanism comprising a pair of brake shoes adapted to cooperate with opposed faces of a disc for braking action, a hanger for each of said shoes, operating means for moving said shoes toward each other for said braking action, a guide element on each shoe, and a guide bar extending from each brake shoe to the guiding element on the opposed shoe for maintaining said shoes in proper alignment during said movement.

2. A brake mechanism comprising a member having opposed braking surfaces and mounted for rotation with mechanism to be controlled by braking action, a pair of brake shoes each of which is adapted to cooperate with one of said surfaces, a hanger for each of said shoes, an operating device for moving said shoes toward each other and against said surface for braking action, a receiving guide carried by each of said shoes, and a guide bar on each of said shoes extending to the receiving guide on the opposed shoe.

3. A brake mechanism comprising a rotatable member having opposed braking surfaces, a pair of movable brake shoes each of which is adapted to cooperate with one of said surfaces, means for moving said shoes to and from braking cooperation with said surfaces, and means for guiding said shoes during such movement, said means comprising a bar guide on each shoe and a projecting bar extending from each shoe into said guide on the opposed shoe to maintain both shoes in proper alignment.

4. In a braking mechanism the combination of a rotating member having a pair of substantially plane braking surfaces, a pair of brake shoes each bearing a friction element and each adapted to be moved into frictional engagement with one of said surfaces, a rigid block attached to each of said shoes and provided with a guiding surface, and a guide arm carried by said block and extending therefrom, the guiding surface on each of said blocks being adapted to receive and guide the guide arm extending from the block on the opposing brake shoe.

5. In combination, a brake mechanism comprising a rotatable brake disc having substantially plane and parallel opposed braking faces, a pair of brake shoes each mounted for braking cooperation with one of said faces, and means for actuating said shoes substantially simultaneously, each of said shoes comprising a body member, a friction element, and guide means for guiding said friction element squarely and evenly into braking engagement with a braking face of said disc, said guide means comprising a block secured to said body member and provided with a projecting guide element and a receiving guide element for the projecting guide element on the opposing brake shoe.

6. In combination, a brake mechanism comprising a rotatable brake disc having substantially plane and parallel opposed braking faces, a pair of brake shoes each mounted for braking cooperation with one of said faces, and means for actuating said shoes substantially simultaneously, each of said shoes comprising a body member, a friction element, and guide means for guiding said friction element squarely and evenly into braking engagement with a braking face of said disc, said guide means comprising a block secured to said body member and provided with a projecting guide bar and a receiving guide notch of size and shape to freely receive and guide the projecting guide bar on the opposing brake shoe.

7. In combination, a brake mechanism comprising a rotatable brake disc having substantially plane and parallel opposed braking faces, a pair of brake shoes each of which is mounted for braking cooperation with one of said faces, and means for actuating said shoes substantially simultaneously, each of said shoes comprising a body member, a friction element, and guide means for guiding said friction element squarely and evenly into braking engagement with a face of said disc, said guide means comprising a block secured to said body member and provided with a rectangular, horizontally projecting guide bar extending to a similar block on the opposed brake shoe, and a rectangular receiving guide on said block of a size and shape to freely receive and guide the projecting guide bar on the opposing brake shoe.

8. In braking apparatus for railway and like equipment, a mounting member for carrying a replaceable friction element on one face of said member, means on said mounting member adapted to support such mounting member on the brake-applying mechanism of a disk-type friction brake mechanism for braking application of a friction element carried by such mounting member to one side surface of the brake-disk of such a friction brake mechanism, and a guide member secured on the other face of said member and having a rigid guide arm extended therefrom across one edge of said member and beyond said one face thereof in perpendicular relation to said one face, said guide member having at least one guide surface located adjacent said other face of said mounting member and spaced laterally from and parallel to said guide arm and adapted, in use, to be engaged by a similar guide arm of another mounting member.

9. In a brake arrangement, a rotor, stators at opposite sides of said rotor adapted for braking engagement therewith, actuating means pivotally connected to said stators, and guide means for controlling pivotal movement of said stators, said guide means comprising a pair of guide elements, one fixed to each stator, each element comprising an arm extending transversely of said rotor and a guide portion disposed at one side of said rotor, the arm of each element engaging the guide portion of the other element.

ROBERT B. POGUE.

REFERENCES CITED

The following references are of record in the file of this patent:

UNITED STATES PATENTS

| Number | Name | Date |
|---|---|---|
| 2,228,818 | Eksergian | Jan. 14, 1941 |
| 2,383,375 | Eksergian et al. | Aug. 21, 1945 |
| 2,423,694 | Eksergian et al. | July 8, 1947 |